May 23, 1933. J. F. WERDER 1,910,909
VALVE STRUCTURE
Filed Jan. 2, 1931
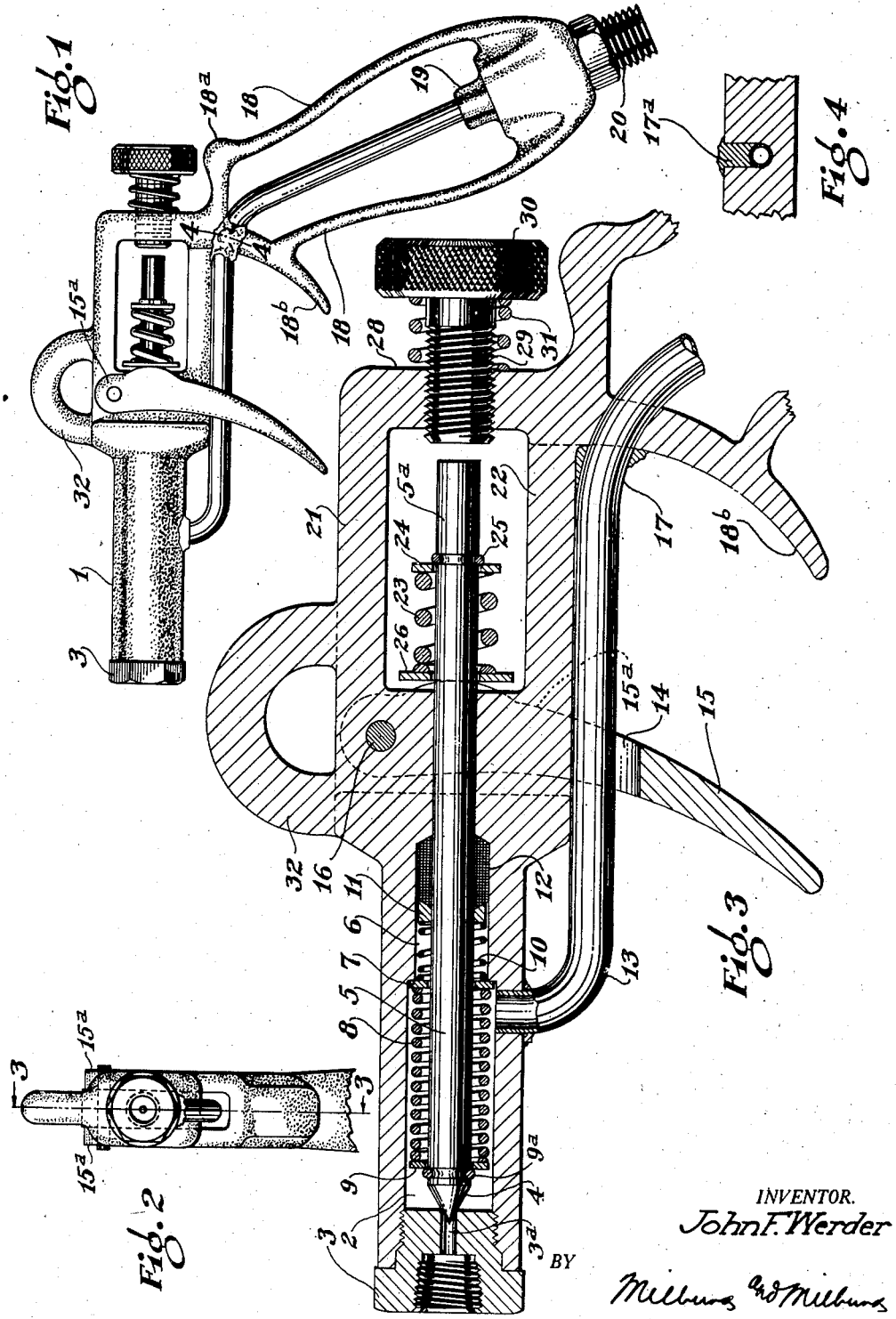
INVENTOR.
John F. Werder
BY
Milburn and Milburn
ATTORNEYS Patented May 23, 1933

1,910,909

UNITED STATES PATENT OFFICE

JOHN F. WERDER, OF LAKEWOOD, OHIO

VALVE STRUCTURE

Application filed January 2, 1931. Serial No. 506,244.

This invention relates to the art of valve structures.

More specifically, the present invention relates to that type of valve structure which embodies a "pistol-grip" form of handle and operating means, this device being especially adapted for connection to the end of a hose or tube for dispensing liquid or other fluid.

Although the present form of invention is especially adapted for use in applying lubricant to an automobile or other machines, yet it is to be understood that the structure herein set forth may be employed for dispensing other forms of fluid, either gas or liquid, and that it may be put to any other use of which it is capable. It is to be understood also, that the present disclosure is merely for purposes of illustration and that other modifications and variations might be devised without departing from the spirit of the present invention as herein set forth and claimed.

One object is to devise an improved form of valve structure of the type above referred to, in which the several parts may be conveniently and efficiently assembled or dis-assembled and which are so constructed and arranged as to co-operate in an efficient manner.

A more specific object consists in devising such a valve structure in which the valve is so located and operated that uniform discharge pressure of the fluid may be obtained at all times during open position of the valve.

A further object is to devise a conveniently operable means for varying the degree to which the valve may be opened and also to render the entire valve structure operable with a minimum degree of wear upon the parts and substantially proof against damage.

Another object consists in devising a supplemental means for locking the valve in closed position and for ensuring effective seating engagement of the valve.

Other objects will appear from the following description and claims when considered together with the accompanying drawing.

Fig. 1 is a side elevation of the present valve structure; Fig. 2 is a front end elevation thereof; Fig. 3 is a view taken on line 3—3 of Fig. 2; and Fig. 4 is a view taken on line 4—4 of Fig. 1.

The casing body of the device has the front end portion 1 thereof bored-out so as to form the valve chamber 2 into the one end of which is screwed the apertured plug 3. The aperture $3^a$ which extends through the plug 3 for discharge of the fluid, is adapted to be closed by the conical end portion 4 which constitutes the valve upon the end of the valve stem 5. The valve seat about the inner end of the aperture $3^a$ is formed as an edge for line contact with the conical surface of the valve member 4. The valve seat member 3 and the valve member 4 may either one or both consist of semi-soft metal capable of deformation so as to insure an effective seating engagement.

In the rearward portion of the chamber 2, there is provided a shoulder 6 against which rests the annular disk 7 for abutting engagement, upon one side thereof, of the coil spring 8 which surrounds the valve stem 5 and which at its other end abuts the annular member 9 maintained upon the valve stem 5 by means of the ring $9^a$ seated in a suitably formed groove about the valve stem 5. The spring 8 normally forces the valve stem forwardly for closing engagement of the valve member 4 with the valve seat. The other side of the annular member 7 is engaged by the one end of the coil spring 10 which engages at its other end the annular member 11 upon the opposite side of which is arranged the packing 12. The inter-engaging surfaces between the annular member 11 and the packing 12 are inclined, as indicated in Fig. 3, and the spring 10 which surrounds the valve stem 5 serves as a means of maintaining the packing 12 in effective engagement at all times about the valve stem at the point where it extends through the rear end of the bored-out portion 1 of the casing body.

At a point just in front of the annular member 7, the side wall of the chambered or bored-out portion 1 of the casing body is provided with an opening which receives the one end of the tubular supply line 13 through which the fluid is fed into the chamber 2 for discharge through the valve. This tube 13 which may be of any suitable form of metal, extends along the under side of the casing body rearwardly thereof and through the opening 14 between the under-side of the body and the clevis form of trigger 15 which is pivotally mounted at the points 16 upon the casing body of the device for the operation of the valve in a manner to be explained. The tube 13 is also firmly secured to the under side of the casing body, as for instance, by means of solder at the point 17 so as to prevent accidental dislodgment thereof. This tube is further protected by means of the hand grip 18 which extends angularly and downwardly from the rear end portion of the casing body. The tube may extend through an opening in the upper end of the hand grip or may be laterally placed in position within a cut-out portion to which solder may then be applied at the same time as it is applied at the point 17. The solder which fills the cut-out portion for maintaining the tube in such position is indicated by reference numeral 17ª. The hand grip comprises the oppositely disposed portions between which the tube extends. The tube 13 is soldered at 19 to the lower end of the hand-grip and has communication therethrough. A threaded connection 20 is secured to the outer lower end of the hand grip for attachment of the usual form of hose or tube for communication with the tube 13.

The rear end portion 5ª of the valve stem which extends longitudinally through the casing body, is shielded by the upper and lower walls 21 and 22 of the rear portion thereof. The rear end portion of the casing body is otherwise open, that is, upon the two sides thereof, to facilitate inspection and assembly or dis-assembly of the parts at this point. The coil spring 23 surrounds this portion of the valve stem and has abutment at its rear end against the annular disk 24 which engages the ring 25 seated in an annular groove in the valve stem. The other end of the spring 23 engages the annular ring 26 which freely surrounds the valve stem and against which the cam portions 27 on the two arms 15ª of the trigger 15 are adapted to engage upon the opposite sides of the valve stem. Thus, rearward movement of the trigger 15 will cause compression of the spring 23 so as to force the valve stem rearwardly or toward the right, as viewed in the drawing, so as to open the valve 4 with compression of the spring 8. Release of the trigger 15 will permit the spring 8 to return the valve to closed position. The purpose of spring 23 will be understood from the following description.

Extending through the rear end 28 of the casing body is the screw-threaded member 29 having the knurled head 30 for manipulation thereof. Screw-threaded engagement of this member permits the same to be adjusted toward and from the rear end of the valve stem with respect to which it is arranged co-axially. The position of the member 29 determines the extent to which the valve stem may be moved rearwardly and thereby determines the extent to which the valve 4 may be opened. Regardless of the degree of opening permitted for the valve 4, the trigger 15 may always be actuated to the same full extent by the index finger by virtue of compression of the spring 23 after the valve stem has engaged the member 29. The spring 31 surrounding the member 29 and arranged between the head 30 thereof and the outer surface of the end portion 28 of the casing body will serve to maintain the member 29 in position to which it is adjusted. Upon extreme adjustment of the screw-threaded member 29 forwardly so as to firmly engage the rear end of the valve stem when the trigger 15 is in idle position, the valve 4 may thereby be positively locked in closed position so as to prevent accidental opening of the valve during periods of time when there is no occasion or desire for operation of the device. It will be observed that the member 29 and the head 30 are so arranged with respect to the hand grip 18 that the head 30 may be conveniently engaged and manipulated by the thumb and index finger of the same hand which engages the hand grip 18 and while the device is held in the hand of the operator. The upper portion 18ª of the hand grip 18 is so formed and arranged with respect to the head 30 that it will guard the same against accidental engagement by the hand of the operator upon the lower side thereof. It will be observed also that the hand grip 18 is provided with the projection 18ᵇ so as to provide comfortable engagement of the front part of the hand grip by the three fingers of the hand. Also, at a point somewhat to the rear of the middle of the casing body and upon the top thereof, I have provided the eye 32 by which the device may be conveniently supported in suspended position upon a hook or the like.

The entire main body portion of the device is herein disclosed, including that portion referred to as the forward tubular portion 1, the rearwardly extending portions 21 and 22, and the hand grip portions, may be formed as a one-piece casting of suitable metal with which also the eye member 32 may be cast as an integral part thereof. It will be observed also that in the present structure, only the front end portion thereof need be bored-out as a chamber, while the rear end portion thereof is open so as to permit constant inspection as well as convenient access thereto. It is to be understood, however, that the front end portion 1, instead of being formed as a bored-out casting integral with the remaining portion of the casting body, may be formed as a separate part either as a tube or turned stock with a suitable form of connection to the remaining portion of the device. Also, the forward end of the tube 13 may be connected in a suitable manner to such modified form of tubing or turned stock as for instance, by means of a screw thread engagement as a substitute for the soldered connection herein disclosed. Likewise, the soldered connection 19 may also be eliminated by extending the tubing 13 through an opening in the bottom end portion of the hand grip 18 and connecting the same in any suitable manner to the main supply tube at a point below and outside of the hand grip. There might also be other variations or modifications of the present disclosure, all of which are intended to be comprehended by the present invention as herein set forth and claimed.

In the present device, there is involved but a single valve for controlling the flow of fluid therethrough and this valve is located at the very extreme forward end of the device. In this way, there is avoided the accumulation of any of the fluid under excessive pressure which might otherwise result in an unusual force of discharge upon the initial opening of the valve. With the present form of device, there is insured a fluid discharge with constant predetermined force throughout the entire period when the valve is open.

The only regulation of this device is effected at a single point: namely, at the point of the single valve at the front end of the device, and effective seating engagement of this valve with its seat is insured by virtue of the line contact between the semi-soft metal of the conical valve member and its seat and also by the effect of the extreme adjustment of member 29 which will serve to form an effective seat for the valve, without danger of leaking.

It will be observed that all of the springs in the present construction are located about the same longitudinal axis and are all arranged in a most compact and convenient manner with suitable means of safe-guarding the same against injury or dislodgment thereof. Also, the engagement of the cam shoulders of the trigger against the opposite sides of the freely arranged disk will automatically cause the disk to creep about the axis of the valve stem and to thereby wear uniformly thereabout as it is repeatedly engaged by the trigger.

The packing provided in the rear end of the valve chamber with the automatically seating engagement thereof, insures at all times a properly sealed connection at this point. Also, that portion of the device which must be air tight is in the present case reduced practically to a minimum, thereby facilitating the manufacture of such a device and serving also to lessen the danger of leaking from the chamber.

The tubing is afforded protection by being extended along the underside of the main body of the device and by being attached thereto, and without having to be unduly exposed at any point especially in the region of the trigger. In fact, all parts of the device are protected in an efficient manner, as above explained, and they are all arranged in an extremely compact form. The entire device is highly dependable in its operation and it is not apt to get out of order.

It is to be understood that this device might be employed not only for the discharge of gas or liquid therefrom in a fine stream or spray, but it is adapted also for dispensing any fluid in any degree of flow; and by means of a suitable form of connection upon the discharge end thereof, this device might for instance be employed also for the supply of air to the inside of an automobile tire or other such device. Any and all such adaptations of the structural features and combinations as herein disclosed are intended to be comprehended by the following claims.

What I claim is:

1. A valve structure comprising a valve casing having a valve opening, a valve therefor having a stem, adjustable means mounted in the casing for determining the extent of opening of the valve, and means including a yieldable connection with the stem for opening the valve, whereby the said valve-opening means may be manipulated to a constant degree for all degrees of opening of the valve.

2. A valve structure comprising a valve casing having a valve opening, a valve therefor having a stem, a coil spring surrounding said stem for normally closing the same, means including a spring surrounding said stem for opening the valve, and means adjustably mounted in the casing for determining the extent of opening of the valve, said parts being so constructed and arranged that said last-named spring will absorb any movement of the opening means beyond the extent of opening allowed for the valve according to the position of said adjusting means.

3. A valve structure of the pistol-grip type, comprising a casing body having a single valve opening at one end thereof, a valve therefor having a stem extending through said casing, means for normally closing the valve, a hand-grip portion upon the rear end portion of said body, a finger trigger member associated therewith and having operative connection with said stem for opening the valve, adjustable means mounted on said body for co-operation with said stem so as to determine the extent of opening of said valve, said adjustable means being so located with respect to said hand-grip portion that it is guarded substantially thereby against accidental engagement by the hand of the operator upon the lower side thereof, and means of supply communication through said casing body to said valve opening.

4. A valve structure of the pistol-grip type, comprising a casing body having a single valve opening at one end thereof, a valve therefor having a single, continuous stem extending through said casing body, means for normally closing the valve, a hand-grip portion upon the rear end portion of said body, a finger trigger member associated therewith and having cam engagement with said stem for opening the valve, adjustable means mounted in said body for co-operation with said stem so as to determine the extent of opening of said valve, and means of supply communication through said casing body to said valve opening.

5. A valve structure comprising a valve casing member having a valve opening with a circular edge surrounding the mouth of said opening, a valve member of conical form adapted to seat upon the edge of said valve opening for line-contact therebetween, at least one of said members being formed of semi-soft metal adapted to be deformed so as to assure effective seating engagement between said valve and valve opening, a stem for said valve, and an adjustable screw threaded means adapted for engagement by said stem, whereby the extent of opening of said valve may be limited and said adjustable means may cause sufficient engagement of the valve with the edge of the valve opening to produce an effective seat therefor, and means for manipulating said valve stem for operation of said valve.

6. A valve structure of the pistol-grip type, comprising a casing body having a chamber at one end portion thereof and a valve opening in the outer end of said chamber, a valve for said opening, a valve stem extending through said chamber, a coil spring located within said chamber and surrounding said stem for normally closing said valve, the rear portion of said body being open, said valve stem extending into said open portion of the body, said body having a hand-grip portion in the rear part thereof, a finger trigger member mounted upon said body substantially midway of the length thereof, and a coil spring surrounding said extended portion of the valve stem and adapted to serve as a yielding operating connection between said trigger and valve stem.

7. A valve structure of the pistol-grip type, comprising a casing body having a chamber at one end portion thereof and a valve opening in the outer end of said chamber, a valve for said opening, a valve stem extending through said chamber, a coil spring located within said chamber and surrounding said stem for normally closing said valve, the rear portion of said body being open, said valve stem extending into said open portion of the body, packing means within said chamber at the point of extension of said valve stem through the rear end of said chamber, a coil spring surrounding said valve stem and having operative seating engagement with said packing, said body having a hand-grip portion in the rear part thereof, a finger trigger member mounted upon said body substantially midway of the length thereof, and a coil spring surrounding said extended portion of the valve stem and adapted to serve as a yielding operating connection between said trigger and valve stem.

8. A valve structure of the pistol-grip type, comprising a casing body having a chamber and a valve opening at one end portion thereof, the other end portion of said body being open with protecting walls extending along the opposite sides thereof, a valve within said chamber for closing said opening, a valve stem extending through said chamber and into said open portion, a supply tube having communication with said chamber, said body having a hand-grip portion at the rear thereof, and a finger trigger member mounted upon said body and having operative connection with said valve stem in said open portion.

9. A valve structure of the pistol-grip type, comprising a casing body having a chamber and a valve opening at one end portion thereof, the other end portion of said body being open with protecting walls extending along the opposite sides thereof, a valve within said chamber for closing said opening, a valve stem extending through said chamber and into said open portion, a supply tube having communication with said chamber, said body having a hand-grip portion at the rear thereof, and a finger trigger member mounted upon said body and having operative connection with said valve stem in said open portion, said supply tube extending along one of said protecting walls and through an opening in said trigger, whereby said tube is afforded protection against distortion.

10. A valve structure of the pistol-grip type, comprising a casing body having a valve chamber at one end portion thereof, said chamber having a valve opening, a valve therefor, a valve stem, a hand-grip at the rear end of said body and extending angularly therefrom, a finger trigger member mounted upon said body for operation of said valve stem, means providing fluid communication for said chamber, and a suspension means provided upon the one side of said body opposite to said hand-grip, said opposite side of said body being otherwise substantially free of projections.

11. A valve structure of the pistol-grip type, comprising a casing body having a valve chamber at one end portion thereof, said chamber having a valve opening, a valve therefor, a valve stem, a hand-grip at the rear end of said body and extending angularly therefrom, a finger trigger member mounted upon said body for operation of said valve stem, a passage communicating with said chamber, and an adjustable means at the rear end of said body for determining the extent of opening movement of said valve stem, said adjustable means being so located with respect to said hand-grip that it can be manipulated by the thumb and index finger while holding said hand-grip in the remaining portion of the same hand.

In witness whereof, I hereby affix my signature.

JOHN F. WERDER.